(12) United States Patent
Kumar

(10) Patent No.: US 11,686,634 B2
(45) Date of Patent: Jun. 27, 2023

(54) PYLON ENGINE MOUNT HEALTH MONITORING SYSTEM

(71) Applicant: Simmonds Precision Products, Inc., Vergennes, VT (US)

(72) Inventor: Varun Kumar, Bangalore (IN)

(73) Assignee: Simmonds Precision Products, Inc., Vergennes, VT (US)

( * ) Notice: Subject to any disclaimer, the term of this patent is extended or adjusted under 35 U.S.C. 154(b) by 330 days.

(21) Appl. No.: 17/018,791

(22) Filed: Sep. 11, 2020

(65) Prior Publication Data

US 2022/0003616 A1   Jan. 6, 2022

(30) Foreign Application Priority Data

Jun. 26, 2020 (IN) .............................. 202041027230

(51) Int. Cl.
| | |
|---|---|
| *G01L 1/24* | (2006.01) |
| *B64F 5/60* | (2017.01) |
| *B64C 3/32* | (2006.01) |
| *G01L 5/00* | (2006.01) |

(52) U.S. Cl.
CPC ................ *G01L 1/246* (2013.01); *B64C 3/32* (2013.01); *B64F 5/60* (2017.01); *G01L 5/00* (2013.01)

(58) Field of Classification Search
CPC ......... G01L 1/246; G01L 5/00; G01L 5/0028; B64C 3/32; B64F 5/60; B64D 2045/0085; B64D 27/18; B64D 27/26; G01M 5/0016; G01M 5/0041; G01M 5/0091; G01M 15/14
See application file for complete search history.

(56) References Cited

U.S. PATENT DOCUMENTS

| | | | |
|---|---|---|---|
| 6,843,449 B1 | 1/2005 | Manteiga et al. | |
| 7,336,862 B1 | 2/2008 | Xai et al. | |
| 7,661,321 B2 * | 2/2010 | Isebrand ................ | B64D 29/06 73/801 |
| 8,576,392 B2 | 11/2013 | Johnston | |
| 8,659,307 B2 * | 2/2014 | Eriksen .................. | B64D 29/06 324/690 |
| 8,894,034 B2 * | 11/2014 | Rogero .................. | B64D 27/18 248/666 |
| 2012/0043978 A1 * | 2/2012 | Eriksen .................. | G01L 1/142 324/690 |
| 2012/0080582 A1 * | 4/2012 | Rogero .................. | B64D 27/26 248/554 |

(Continued)

FOREIGN PATENT DOCUMENTS

| | | |
|---|---|---|
| EP | 2500703 A1 | 9/2012 |
| GB | 2393249 A | 3/2004 |

OTHER PUBLICATIONS

Extended European Search Report dated Nov. 30, 2021, issued during the prosecution of European Patent Application No. EP 21181195.5.

*Primary Examiner* — Freddie Kirkland, III
(74) *Attorney, Agent, or Firm* — Locke Lord LLP; Joshua L. Jones; Scott D. Wofsy

(57) ABSTRACT

A system comprises an engine mounted to an aircraft wing by a plurality of clevis pins, a respective strain sensor mounted in at least one of the clevis pins, and a monitoring system operatively connected to each respective strain sensor to monitor stress in each of the clevis pins having a respective strain sensor.

15 Claims, 5 Drawing Sheets

(56) References Cited

U.S. PATENT DOCUMENTS

| | | |
|---|---|---|
| 2017/0021914 A1 | 1/2017 | Small et al. |
| 2019/0375493 A1 | 12/2019 | Schwindt |
| 2020/0271542 A1* | 8/2020 | Sarlashkar ............... G01L 5/24 |

* cited by examiner

PYLON ENGINE MOUNT HEALTH MONITORING SYSTEM

CROSS-REFERENCE TO RELATED APPLICATIONS

This application claims priority under 35 U.S.C. § 119 to Indian Provisional Patent Application No. 202041027230 filed in India on Jun. 26, 2020 the entire contents of which are incorporated by reference herein.

BACKGROUND

1. Field

The present disclosure relates to health monitoring for aircraft, and more particularly to monitoring health of engine pylons in aircraft.

2. Description of Related Art

Physical examination of aircraft structural health is challenging, especially with pressure to spend less time between consecutive flights. Engine mounts are the parts which attach the engine of an aircraft to the pylon on the wing. Engine mounts are one of the most stressed parts in the whole aircraft, especially during takeoff and landing. They are also one of the most hidden parts, making it impossible to inspect them visually, e.g. between flights. The state of the art is for these critical parts to be inspected and overhauled on a time based scheduled maintenance. Real time monitoring of such flight critical parts would be a great preventive measure and a final seal on any possibilities of failure by fatigue.

The conventional techniques have been considered satisfactory for their intended purpose. However, there is an ever present need for improved systems and methods for health monitoring in pylons and engine mounts for aircraft. This disclosure provides a solution for this need.

SUMMARY

A system comprises an engine mounted to an aircraft wing by a plurality of clevis pins, a respective strain sensor mounted in at least one of the clevis pins, and a monitoring system operatively connected to each respective strain sensor to monitor stress in each of the clevis pins having a respective strain sensor. In the system, each respective strain sensor includes a respective fiber Bragg grating. The monitoring system is optically coupled to each respective fiber Bragg grating to illuminate each respective fiber Bragg grating. The monitoring system monitors changes in wavelength reflected from each respective fiber Bragg grating, and monitors stress in each of the clevis pins having a respective fiber Bragg grating.

The monitoring system can be configured to provide real-time stress monitoring based on reflections from each respective fiber Bragg grating. Real-time stress monitoring can include monitoring both static and dynamic load spectra on each of the clevis pins having a respective fiber Bragg grating. Each respective fiber Bragg grating can include multiple Bragg reflectors.

The system can further comprise a pylon affixed to the wing, and the engine can be mounted to the pylon at a plurality of engine mounts. The plurality of clevis pins can include at least seven clevis pins affixing the pylon to the wing, and an entirety of a load of the engine on the wing can pass through the at least seven clevis pins. The monitoring system can be configured to detect a shift in reflected wavelength corresponding to a stress leading to significant latent fatigue. The monitoring system can be configured to raise a high priority damage flag if the stress leading to significant latent fatigue exceeds a predetermined threshold. The clevis pins can be fuse pins.

A method comprises monitoring stress in at least one clevis pin in a plurality of clevis pins in a load bearing path from an aircraft wing to an aircraft engine. Monitoring stress can be performed in real time. Monitoring stress can include illuminating a respective fiber Bragg grating in each of the at least one clevis pins. Monitoring stress can include monitoring changes in wavelength reflected from each respective fiber Bragg grating to monitor stress in each of the at least one clevis pins having a respective fiber Bragg grating.

Real-time stress monitoring can include monitoring both static and dynamic load spectra on each of the clevis pins having a respective fiber Bragg grating. Real-time stress monitoring can include detecting a shift in reflected wavelength corresponding to a stress leading to significant latent fatigue. Real-time stress monitoring can include raising a high priority damage flag if the stress leading to significant latent fatigue exceeds a predetermined threshold.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
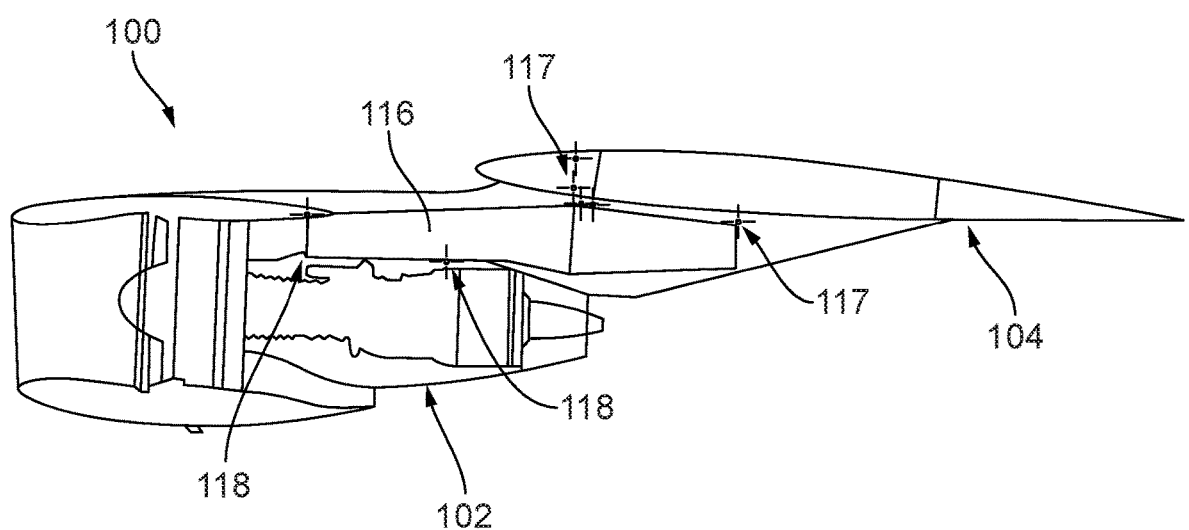
FIG. 1 is a schematic side elevation view of an embodiment of an aircraft engine pylon health monitoring system constructed in accordance with the present disclosure, showing an aircraft engine attached to a wing via a pylon.

Reference will now be made to the drawings wherein like reference numerals identify similar structural features or aspects of the subject disclosure. For purposes of explanation and illustration, and not limitation, a partial view of an embodiment of an engine pylon health monitoring system in accordance with the disclosure is shown in FIG. 1 and is designated generally by reference character 100. Other embodiments of systems in accordance with the disclosure, or aspects thereof, are provided in FIGS. 2-7, as will be described. The systems and methods described herein can be used for real-time stress monitoring of clevis pins for pylons in mounting engines to aircraft.

Figure 2:
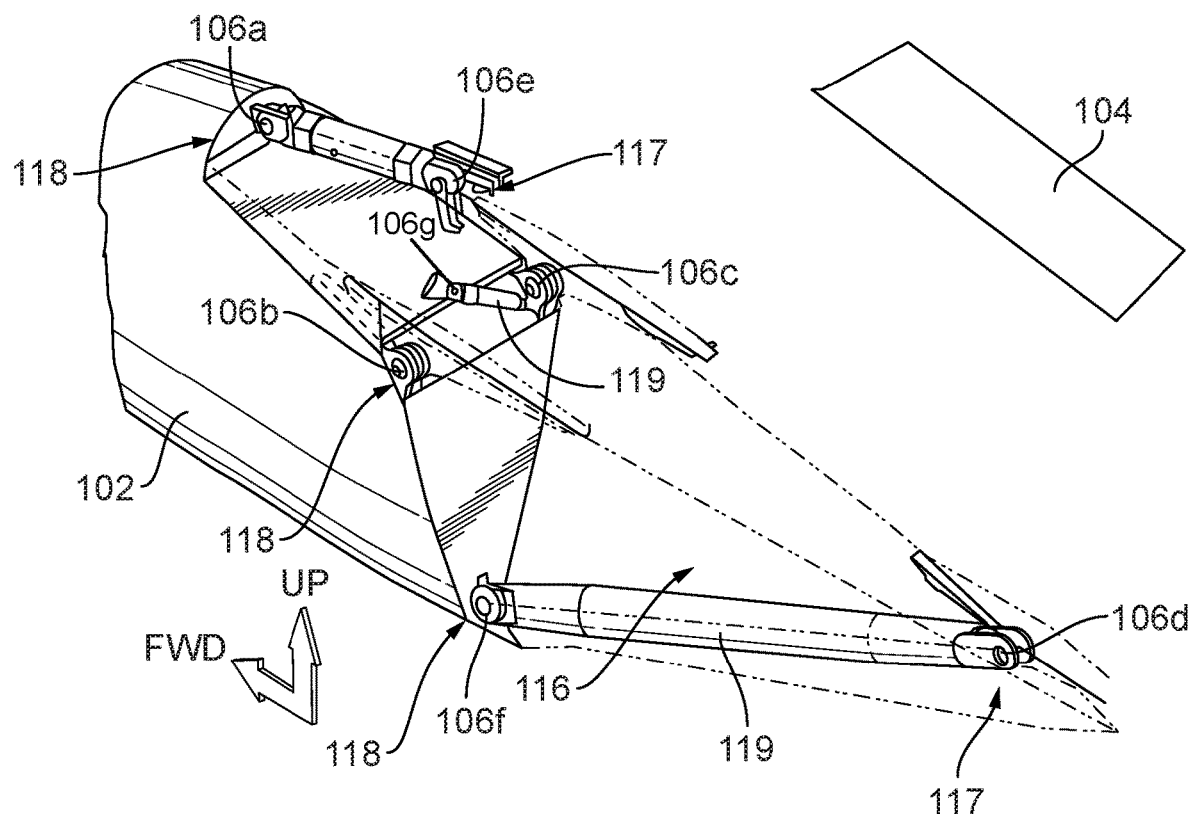
FIG. 2 is a schematic perspective view of the system of FIG. 1, showing a plurality of clevis pins affixing a pylon to the engine and wing.
Figure 3:
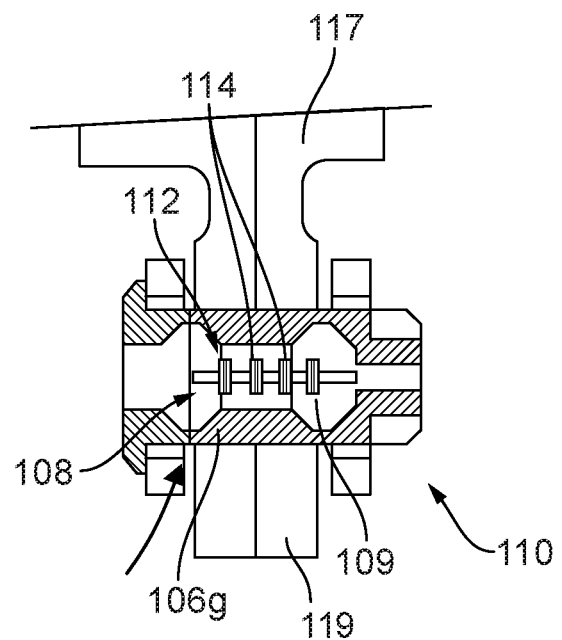
FIG. 3 is a schematic front view of a clevis pin affixing a pylon to the wing.
Figure 4:
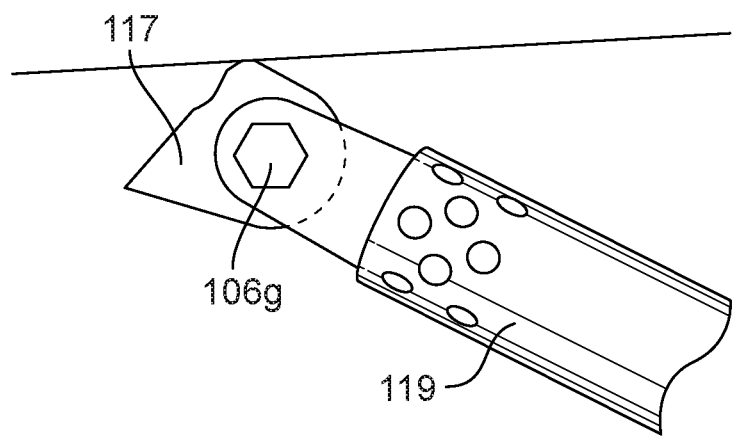
FIG. 4 is schematic side view of the clevis pin of FIG. 3.

Referring to FIGS. 1-3, a system 100 comprises an engine 102 mounted to an aircraft wing 104 by a plurality of clevis pins 106, a respective strain sensor 108 mounted in at least one of the clevis pins 106, and a monitoring system 110 operatively connected to each respective strain sensor 108 to monitor stress in each of the clevis pins 106 having a respective strain sensor 108. Each clevis pin 106 having a respective strain sensor 108 can also include a hollow core 109 configured to receive at least a portion of the respective strain sensor 108. In the system 100, each respective strain sensor 108 can include a respective fiber Bragg grating 112 (e.g. as shown in FIG. 3).

Figure 5:
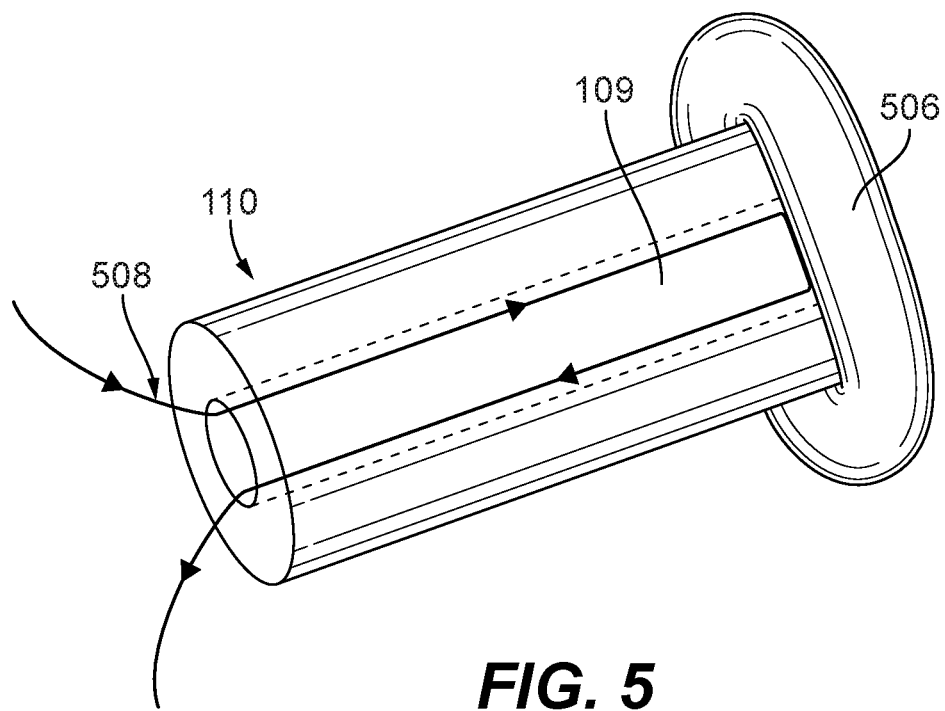
FIG. 5 is a schematic perspective view of a clevis pin showing an arrangement of a strain sensor within a clevis pin.
Figure 6:
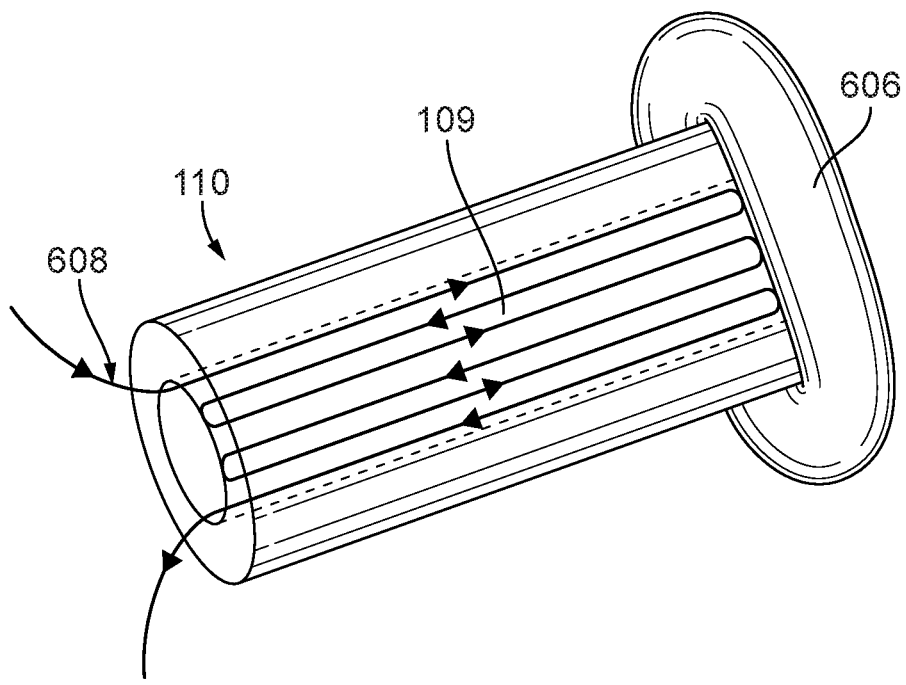
FIG. 6 is a schematic perspective view of a clevis pin showing another arrangement of a strain sensor within a clevis pin.

Shown in FIGS. 3-6, the monitoring system 110 can be optically coupled to each respective fiber Bragg grating 112 to illuminate each respective fiber Bragg grating 112. The respective strain sensor 108 can have any suitable arrangement within the clevis pin 106, for example, the respective strain sensor 108 can have an arrangement shown in pin 506 in FIG. 5 (e.g. strain sensor 508) or as shown in pin 606 in FIG. 6 (e.g. strain sensor 608). The arrangement of the strain sensor can include a at least two passes of the hollow core 109 as shown in FIG. 5, or the arrangement can include a plurality of passes of the hollow core 109 as shown in FIG. 6. An arrangement having multiple passes of the hollow core 109 allows for a more reliable strain sensor as there is increased opportunity to detect strain, as well as providing higher resolution stress and/or strain monitoring. The monitoring system 110 can monitor changes in wavelength reflected from each respective fiber Bragg grating 112, and can monitor stress in each of the clevis pins 106 having a respective fiber Bragg grating 112.

In monitoring the changes in reflected wavelength from each respective fiber Bragg grating, the monitoring system 110 can be configured to provide real-time stress monitoring based on reflections from each respective fiber Bragg grating 112. Real-time stress monitoring can include monitoring both static and dynamic load spectra on each of the clevis pins 106 having a respective fiber Bragg grating 112. Each respective fiber Bragg grating 112 can include multiple Bragg reflectors 114 (e.g. as shown in FIG. 3).

Referring back to FIGS. 1-4, the system 100 can further comprise a pylon 116 affixed to the wing 104, and the engine 102. The engine 102 and wing 104 can be mounted to the pylon 116 at a plurality of engine mounts 118 and wing mounts 117. Mounting the pylon 116 to the engine 102 can include supporting the pylon 116 with a plurality of braces 119 (e.g. as shown in FIG. 2). The plurality of clevis pins 106 can include seven clevis pins 106a-106g affixing the pylon 116 to the wing 104. Each aircraft requires a certain number of clevis pins 106 to safely mount an engine 102, for example, as shown in FIG. 2, the plurality of clevis pins 106 can include seven clevis pins 106a-106g. However, an aircraft may require any number of clevis pins 106, which can be less than seven or more than seven. It is possible that an entirety of a load of the engine 102 on the wing 104 can pass through the clevis pins 106a-106g.

The monitoring system 110 can be configured to detect a shift in reflected wavelength corresponding to a stress leading to significant latent fatigue. A fiber Bragg grating sensor can include a plurality of gratings within an optical fiber core, and each grating can different refractive index. Fiber Bragg grating sensors are known and described in "Cost-Effectiveness of Structural Health Monitoring in Fuselage maintenance of the Civil Aviation Industry," the contents of which is incorporated herein in its entirety. The monitoring system 110 can be configured to raise a high priority damage flag if the stress leading to significant latent fatigue exceeds a predetermined threshold. It is contemplated that the clevis pins 106 can be fuse pins, or any other suitable affixing pin.

Figure 7:
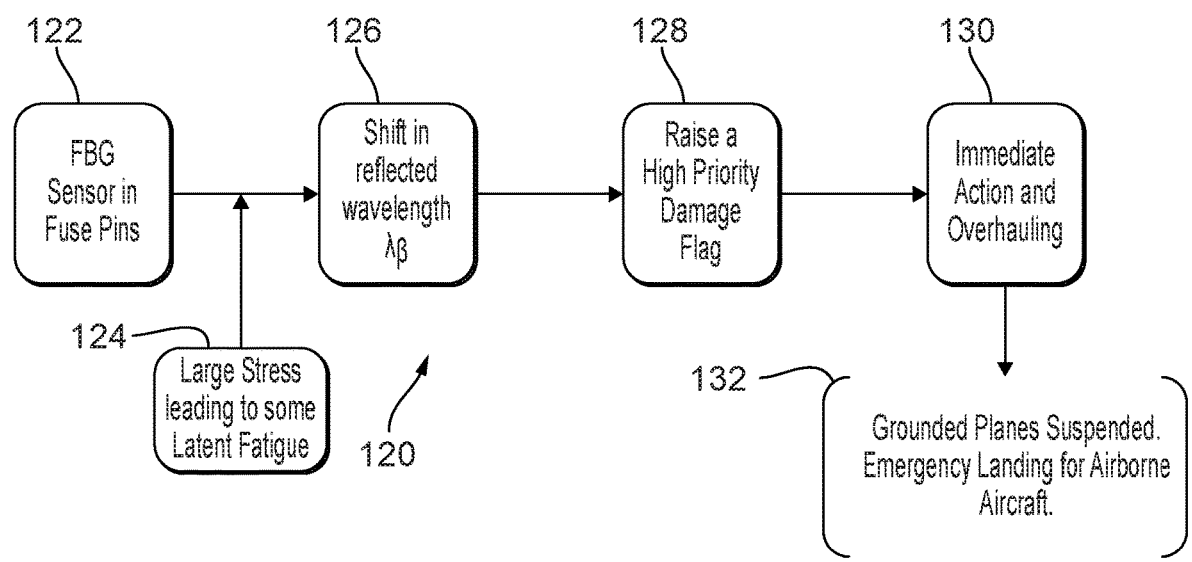
FIG. 7 is a schematic flow diagram showing a method in accordance with the present disclosure.

FIG. 7 shows a method 120. Box 122 shows monitoring stress in at least one clevis pin 106 in a plurality of clevis pins 106 in a load bearing path from an aircraft wing 104 to an aircraft engine 102. In this way, monitoring stress can be performed in real time. Monitoring stress can include illuminating a respective fiber Bragg grating 112 in each of the at least one clevis pins 106. Monitoring stress can also include monitoring changes in wavelength reflected from each respective fiber Bragg grating to monitor stress in each of the at least one clevis pins 106 having a respective fiber Bragg grating 112.

Real-time stress monitoring can include monitoring both static and dynamic load spectra on each of the clevis pins 106 having a respective fiber Bragg grating 112. Shown at box 124, a stress can be placed upon at least one of the clevis pins 106. At box 126, real-time stress monitoring can include detecting a shift in reflected wavelength corresponding to the stress of box 124 leading to significant latent fatigue. Shown at box 128, real-time stress monitoring can further include raising a high priority damage flag if the stress leading to significant latent fatigue exceeds a predetermined threshold. At box 130, an action can be taken in response the high priority damage flag, for example, as shown at box 132, a plane can be grounded for maintenance, further flights suspended, or an emergency landing for an airborne aircraft.

The methods and systems of the present disclosure, as described above and shown in the drawings, provide for real-time pylon health monitoring in flight, where pylon health anomalies can typically only be detected on the ground. Potential benefits of the systems and methods as described can include giving pilots virtual access to a zone of the aircraft which is not visible during flight, and encouraging the use of composites, which can enhance performance and efficiency of aircraft, thereby reducing operating costs. Additionally, fiber Bragg grating sensors can be lightweight, flexible, passive (e.g. requiring no external power supply), can withstand environmental conditions, and can be insensitive to electromagnetic disturbances and/or interferences.

While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   an engine mounted to an aircraft wing by a plurality of clevis pins;
   a respective strain sensor mounted in a hollow core of at least one of the clevis pins; and
   a monitoring system operatively connected to each respective strain sensor to monitor stress in each of the clevis pins having a respective strain sensor.

2. The system as recited in claim 1, wherein each respective strain sensor includes a respective fiber Bragg grating, and wherein the monitoring system is optically coupled to each respective fiber Bragg grating to illuminate each respective fiber Bragg grating and to monitor changes in wavelength reflected from each respective fiber Bragg grating to monitor stress in each of the clevis pins having a respective fiber Bragg grating.

3. The system as recited in claim 2, wherein the monitoring system is configured to provide real-time stress monitoring based on reflections from each respective fiber Bragg grating.

4. The system as recited in claim 3, wherein real-time stress monitoring includes monitoring both static and dynamic load spectra on each of the clevis pins having a respective fiber Bragg grating.

5. The system as recited in claim 2, wherein each respective fiber Bragg grating includes multiple Bragg reflectors.

6. The system as recited in claim 1, further comprising a pylon affixed to the wing, wherein the engine is mounted to the pylon at a plurality of engine mounts.

7. The system as recited in claim 6, wherein the plurality of clevis pins includes at least seven clevis pins affixing the pylon to the wing, wherein an entirety of a load of the engine on the wing passes through the at least seven clevis pins.

8. The system as recited in claim 2, wherein the monitoring system is configured to detect a shift in reflected wavelength corresponding to a stress leading to significant latent fatigue.

9. The system as recited in claim 8, wherein the monitoring system is configured to raise a high priority damage flag if the stress leading to significant latent fatigue exceeds a predetermined threshold.

10. The system as recited in claim 1, wherein the clevis pins are fuse pins.

11. A method comprising:
monitoring stress with a respective strain sensor in a hollow core in at least one clevis pin in a plurality of clevis pins in a load bearing path from an aircraft wing to an aircraft engine.

12. The method as recited in claim 11, wherein monitoring stress is performed in real time.

13. The method as recited in claim 11, wherein monitoring stress includes illuminating a respective fiber Bragg grating in each of the at least one clevis pins and monitoring changes in wavelength reflected from each respective fiber Bragg grating to monitor stress in each of the at least one clevis pins having a respective fiber Bragg grating.

14. The method as recited in claim 13, wherein real-time stress monitoring includes monitoring both static and dynamic load spectra on each of the clevis pins having a respective fiber Bragg grating.

15. The method as recited in claim 13, wherein real-time stress monitoring includes detecting a shift in reflected wavelength corresponding to a stress leading to significant latent fatigue, and raising a high priority damage flag if the stress leading to significant latent fatigue exceeds a predetermined threshold.

* * * * *